US008269840B2

United States Patent
Lee et al.

(10) Patent No.: US 8,269,840 B2
(45) Date of Patent: Sep. 18, 2012

(54) IMAGE STABILIZATION DRIVING ASSEMBLY

(75) Inventors: Seung-hwan Lee, Suwon-si (KR); Kwang-seok Byon, Suwon-si (KR); Kyung-bae Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 303 days.

(21) Appl. No.: 12/750,273

(22) Filed: Mar. 30, 2010

(65) Prior Publication Data

US 2010/0265343 A1 Oct. 21, 2010

(30) Foreign Application Priority Data

Apr. 20, 2009 (KR) .................. 10-2009-0034213

(51) Int. Cl.
*H04N 5/228* (2006.01)
(52) U.S. Cl. .................. 348/208.11; 348/208.7
(58) Field of Classification Search .............. 348/208.99, 348/208.2, 208.4, 208.5, 208.7–208.11; 396/52–55
See application file for complete search history.

(56) References Cited

U.S. PATENT DOCUMENTS

| 7,679,647 | B2* | 3/2010 | Stavely et al. | 348/208.99 |
|---|---|---|---|---|
| 7,962,023 | B2* | 6/2011 | Lee et al. | 396/55 |
| 2001/0022688 | A1 | 9/2001 | Kosaka et al. | |
| 2007/0172220 | A1 | 7/2007 | Masuda | |

FOREIGN PATENT DOCUMENTS

EP 2 141 915 A2 1/2010

* cited by examiner

*Primary Examiner* — Tuan Ho
(74) *Attorney, Agent, or Firm* — Drinker Biddle & Reath LLP (57) ABSTRACT

An image stabilization driving assembly that corrects a shake of a digital camera includes a driving plate in which a correction lens is mounted and that operates in a direction perpendicular to an optical axis; a base plate that supports the driving plate at a rear of the driving plate; a tilt correction plate fastened at a rear of the base plate and that adjusts the fastening degree and corrects tilting of the driving plate; and a plurality of suspension wires having one end fixed to the driving plate, another end fixed to the tilt correction plate, and extending through the base plate. The plurality of suspension wires may be formed of an elastic material.

21 Claims, 11 Drawing Sheets

IMAGE STABILIZATION DRIVING ASSEMBLY

CROSS-REFERENCE TO RELATED PATENT APPLICATION

This application claims the priority benefit of Korean Patent Application No. 10-2009-0034213, filed on Apr. 20, 2009, in the Korean Intellectual Property Office, the disclosure of which is incorporated herein in its entirety by reference.

BACKGROUND

1. Field of the Invention

The invention relates to an image stabilization driving assembly, and more particularly, to an image stabilization driving assembly that corrects image blur caused by a tremble of a photographer's hands.

2. Description of the Related Art

Generally, digital cameras are apparatuses that capture an image of an object, change the image to image data, and record the image data in an image file. However, when a camera shake due to a tremble of a photographer's hands or surrounding vibrations is reflected on a captured image, a deteriorated image such as a blurred image may result. Conventionally, a camera may be mounted on a supporter such as a tripod so as to stabilize the camera before an image is captured. However, recently, as digital cameras are inclined to be compact and slim as a result of technological development and mobile devices such as cellular phones have camera or camcorder functions, mobile devices are generally used to take a picture without a separate supporter. Accordingly, various technologies of image stabilization have been developed to automatically compensate for camera shake, and an optical method of controlling a compensation lens to appropriately compensate for movement corresponding to the camera shake and an electronic method of controlling an image sensor instead of the compensation lens have been studied and developed.

SUMMARY

Embodiments of the invention include an image stabilization driving assembly having a correction tool so as to easily correct erroneous tilting of a correction operation.

Embodiments of the invention also include an image stabilization driving assembly for controlling a correction operation at a symmetrical position so as to improve stabilization of the correction operation.

According to an embodiment of the invention, an image stabilization driving assembly for correcting a camera shake includes a driving plate in which a correction lens is mounted and that operates in a direction perpendicular to an optical axis; a base plate that supports the driving plate at a rear of the driving plate; a tilt correction plate fastened at a rear of the base plate and that adjusts the fastening degree and corrects tilting of the driving plate; and a plurality of suspension wires having one end fixed to the driving plate, another end fixed to the tilt correction plate, and extending through the base plate, the plurality of suspension wires formed of an elastic material.

The base plate and the tilt correction plate may be screwed into each other. The base plate and the tilt correction plate may be screwed into each other in different first, second, and third positions.

Two elastic members that apply an elastic bias in directions against the base plate and the tilt correction plate may be disposed in the first and second positions. The respective elastic members may be cylindrical hollow members that include an assembly hole into which a screw member is inserted. At least one of the elastic members may include a plate member including the assembly hole into which the screw member is inserted and an elastically bent leg portion extending from the plate member.

A rigid boss member that secures a predetermined space between the base plate and the tilt correction plate may be disposed in the third position.

The image stabilization driving assembly may further include a voice coil motor (VCM) magnet and a VCM coil disposed on two surfaces where the driving plate and the tilt correction plate face each other and that perform an electromagnetic correlation. The VCM magnet may be disposed in the driving plate and the VCM coil may be disposed in the base plate. The VCM magnet may be disposed in the base plate and the VCM coil may be disposed in the driving plate.

The VCM magnet may include a pair of first magnets and a pair of second magnets disposed on both sides of the optical axis, respectively, wherein the first magnets are disposed to invert N-S polarity in a first direction, and the second magnets are disposed to invert the N-S polarity in a second direction.

The VCM magnet may include a pair of unified magnets disposed on both sides of the optical axis, wherein the unified magnets are magnetized to have a portion where the N-S polarity is inverted in a first direction and have another portion where the N-S polarity is inverted in a second direction.

The VCM coil may include a pair of first coils and a pair of second coils disposed on both sides of the optical axis, respectively.

According to another embodiment of the invention, an image stabilization driving assembly for correcting a camera shake includes a driving plate in which a correction lens is mounted and that operates in a direction perpendicular to an optical axis; a base plate that supports the driving plate at a rear of the driving plate; a plurality of suspension wires that elastically connect the driving plate and the base plate; and a pair of driving units that provide a driving force to the driving plate and that are disposed on both sides of the optical axis.

The pair of driving units may include a pair of first direction driving units and a pair of second direction driving units that produce a driving force in first and second directions, respectively, perpendicular to the optical axis, wherein the pair of first direction driving units and the pair of second direction driving units are disposed on both sides of the optical axis, respectively.

The pair of driving units may include a VCM magnet and a VCM coil disposed on two surfaces where the driving plate and the tilt correction plate face each other and that perform an electromagnetic correlation. The VCM magnet may be disposed in the driving plate and the VCM coil may be disposed in the base plate. The VCM magnet may be disposed in the base plate and the VCM coil may be disposed in the driving plate.

The VCM magnet may include a pair of first magnets and a pair of second magnets disposed on both sides of the optical axis, respectively, wherein the first magnets are disposed to invert N-S polarity in a first direction, and the second magnets are disposed to invert the N-S polarity in a second direction.

The VCM magnet may include a pair of unified magnets disposed on both sides of the optical axis, wherein the unified magnets are magnetized to have a portion where the N-S polarity is inverted in a first direction and have another portion where the N-S polarity is inverted in a second direction.

The VCM coil may include a pair of first coils and a pair of second coils disposed on both sides of the optical axis, respectively.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Exemplary embodiments of the invention will be described in detail with reference to the attached drawings.

Figure 1:
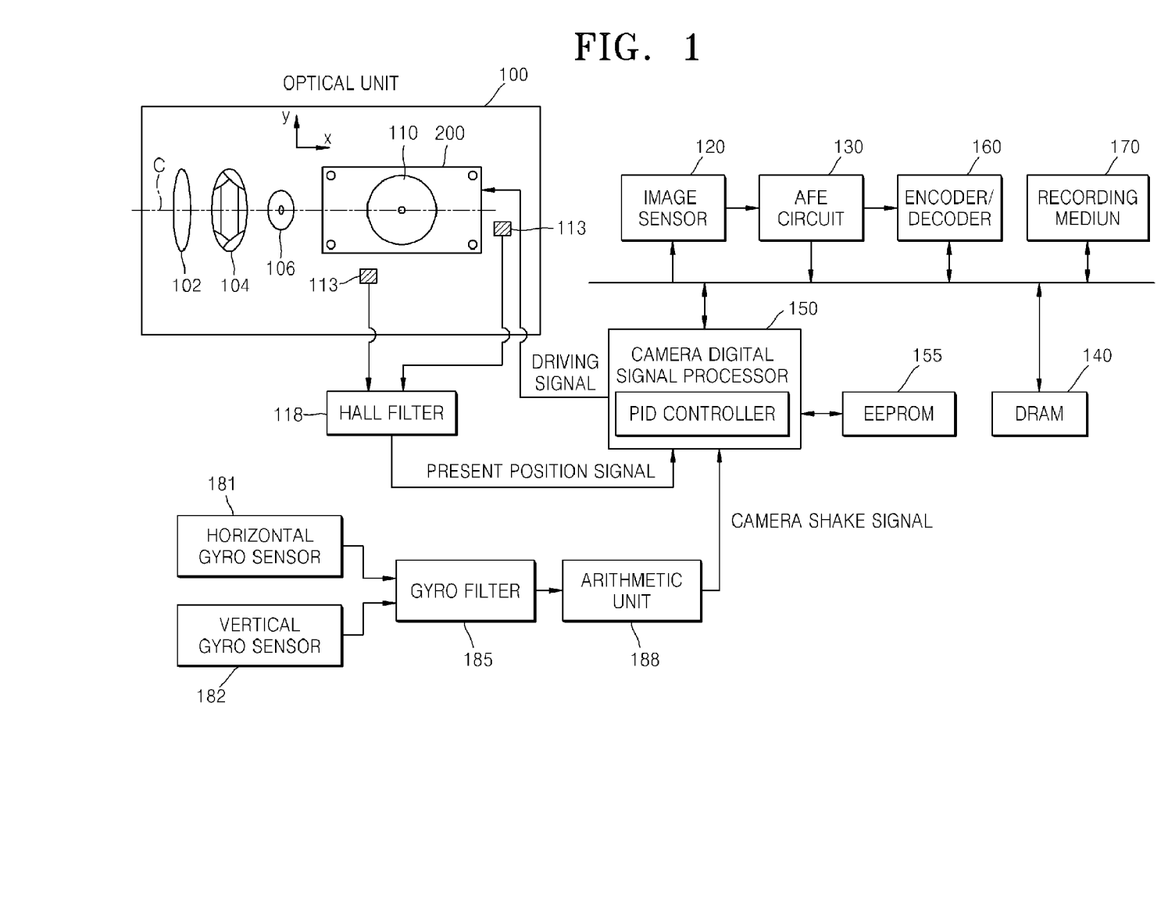
FIG. 1 is a schematic block diagram illustrating an overall structure of a digital camera to which an image stabilization driving assembly is applied, according to an embodiment of the invention.

FIG. 1 is a schematic block diagram illustrating an overall structure of a digital camera to which an image stabilization driving assembly 200 is applied, according to an embodiment of the invention. Referring to FIG. 1, the digital camera includes an optical unit 100 that includes a plurality of optical lenses and forms an image of an object on a photographing surface, an image sensor 120 that converts the object image that passes through the optical unit 100 to electrical image signals, an analog front end (AFE) circuit 130 that processes output signals of the image sensor 120 and converts the output signals to quantized digital image signals, a dynamic random access memory (DRAM) 140 that temporarily stores the digital image signals so as to provide a processing area for image processing, a recording medium 170 that stores image data of the object as a still image file or a moving picture file, and a camera digital signal processor (DSP) 150 that generally controls overall data flow and each of the constituting elements of the digital camera.

The optical unit 100 includes a zoom lens 102 that moves back and forth along a direction of an optical axis C to change a focal distance, a shutter 104 and an iris diaphragm 106 that adjust an exposure time of and an amount of incident light on the image sensor 120, and a correction lens 110 that forms the object image on the image sensor 120 and performs a correction operation for a hand tremble. The correction lens 110 performs the correction operation by moving on an x-y plane perpendicular to the optical axis C so as to correct an image shake occurring due to a hand tremble, tracing movement of an image forming position of the object due to the hand tremble, and fixing the image forming position of the object. The image stabilization driving assembly 200 in which the correction lens 110 is mounted drives the correction lens 110 along a horizontal axis (x-axis) and a vertical axis (y-axis) according to a control signal output by the camera DSP 150 in order to move the correction lens 110 to a target position.

Two Hall sensors 113 may be disposed adjacent to the correction lens 110 so as to detect coordinate values of the horizontal axis (x-axis) and the vertical axis (y-axis) corresponding to the present position of the correction lens 110. The hall sensors 113 detect the present position of the correction lens 110 in a uniaxial direction. One of the Hall sensors 113 detects a coordinate value of the correction lens 110 with respect to the horizontal axis (x-axis) and the other Hall sensor 113 detects a coordinate value of the correction lens 110 with respect to the vertical axis (y-axis). A coordinate signal of the present position of the correction lens 110 output from the Hall sensors 113 is transferred to the camera DSP 150 via a proper Hall filter 118 that removes noise components and extracts desired frequency components.

The image sensor 120 may include, for example, a charge-coupled device (CCD) or complementary metal-oxide semiconductor (CMOS) image sensor, and converts an incident object image passing through the optical unit 100 to electrical image signals. The operation of the image sensor 120 may be controlled by the DSP 150 by using a timing generator (TG) (not shown).

The AFE circuit 130 performs a sample hold operation according to a correlated double sampling (CDS) process to maintain a signal to noise ratio, controls gain of an image signal according to an auto gain control (AGC) process, and performs an analog digital conversion (ADC) process on output signals of the image sensor 120 to convert the analog image signals output from the image sensor 120 to quantized digital image signals. The quantized digital image signals are transferred to an encoder/decoder 160 and converted to coded data according to a predetermined compression method, such as JPEG or MPEG, and then are stored in the recording medium 170. The DRAM 140 (or a synchronous dynamic random access memory (SDRAM)) provides a process area for processing data. For example, the encoder/decoder 160 and the camera DSP 150 use the DRAM 140 as the process area. The camera DSP 150 executes programs recorded in an electrically erasable and programmable read-only memory (EEPROM) 155, generally controls each of the constituting elements of the digital camera, and performs various processes. In particular, the camera DSP 150 performs a correction operation of stabilizing an image, applies a controlled driving signal to the image stabilization driving assembly 200, and calculates a target position of the correction lens 110 to offset camera shake, so that the correction lens 110 is moved toward the target position.

A horizontal gyro sensor 181 and a vertical gyro sensor 182 are installed in the digital camera on one side to measure angular velocities of the digital camera with respect to a horizontal axis (x-axis) and a vertical axis (y-axis), respectively. A gyro filter 185 that has a selection characteristic with respect to a specific bandwidth is disposed on the output side of the gyro sensors 181 and 182 and allows desired frequency components to pass through. Subsequently, an arithmetic unit 188 disposed after the gyro filter 185 calculates the amount of camera shake by a proper integration process. The camera DSP 150 calculates a target position for the correction lens 110 to move in a direction opposite to camera shake to offset the calculated amount of camera shake. The camera DSP 150 inputs the target position for the correction lens 110 and the present position output by the Hall sensors 118, performs a proportional integrated derivative (PID) control operation, applies the controlled driving signal to the image stabilization driving assembly 200, and moves the correction lens 110 toward the target position.

Figure 2:
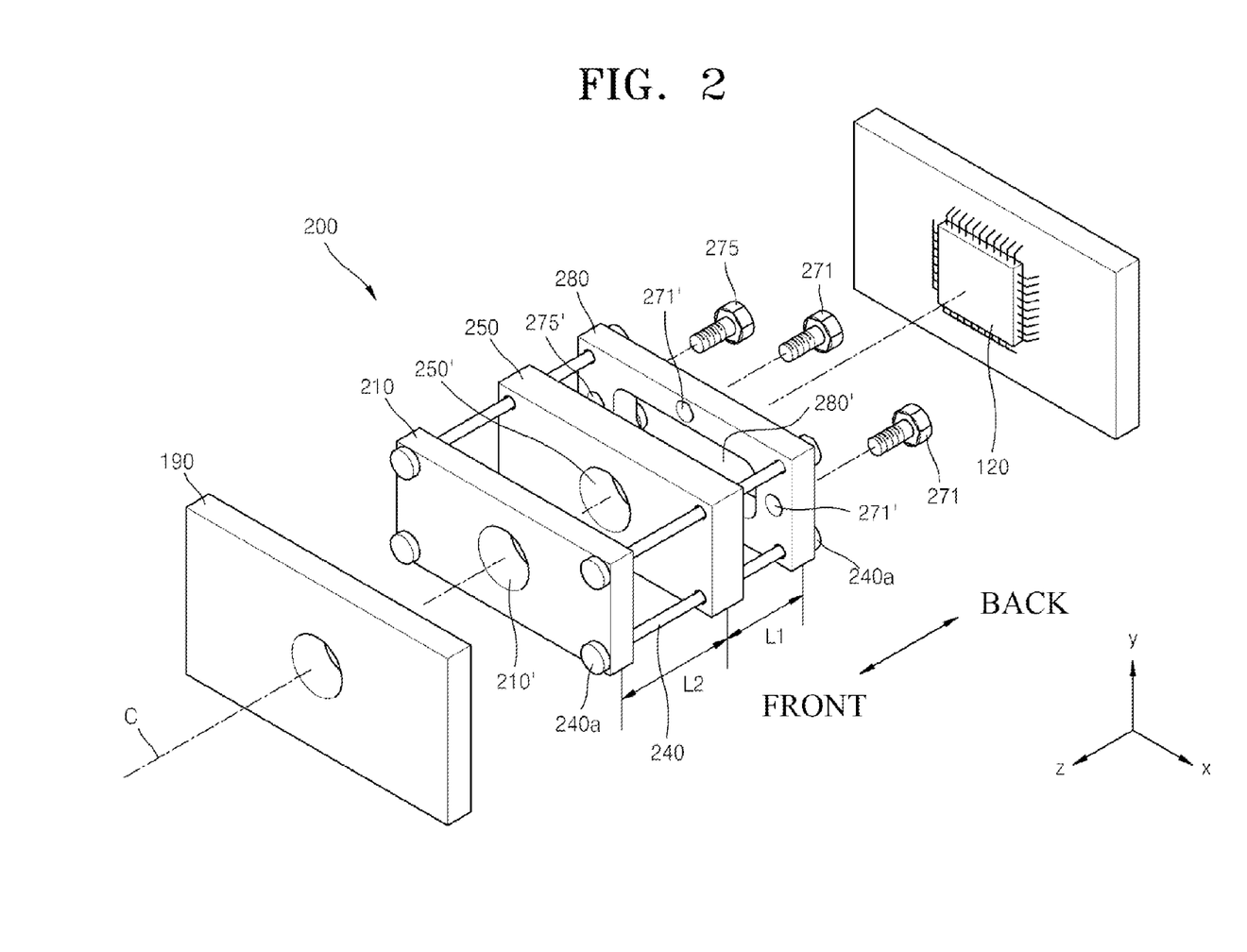
FIG. 2 is an exploded perspective view of an image stabilization driving assembly, according to an embodiment of the invention.

FIG. 2 is an exploded perspective view of the image stabilization driving assembly 200, according to an embodiment of the invention. Referring to FIG. 2, the image stabilization driving assembly 200 may be disposed in a barrel and may be disposed on an optical axis C between a front frame 190 of the barrel and the image sensor 120. The image stabilization driving assembly 200 includes a driving plate 210, a base plate 250, and a tilt correction plate 280 that are disposed on front and rear sides of the image stabilization driving assembly 200 and are assembled via a plurality of suspension wires 240. Three optical transmission holes 210', 250' and 280' are disposed in the driving plate 210, the base plate 250, and the tilt correction plate 280, respectively, along the optical axis C such that a subject image input through the front frame 190 disposed on the front side of the image stabilization driving assembly 200 reaches the image sensor 120 disposed on the rear side of the image stabilization driving assembly 200 and forms an optical path of the object image along the optical transmission holes 210', 250' and 280'. The correction lens 110 is mounted in the optical transmission hole 210' of the driving plate 210, and operates on an x-y surface perpendicular to the optical axis C, and performs a correction operation. The base plate 250 structurally supports the driving plate 210 and may be mounted in the barrel so as to move along the barrel. The base plate 250 is disposed to face the driving plate 210 by a clearance influenced by an electromagnetic force. The suspension wires 240, which elastically connect the base plate 250 and the driving plate 210, tracks the driving plate 210 when performing a translation motion along the x-y surface while generating a flexibly bended elastic transform, so that the driving plate 210, having its driving force removed, is returned to an original state by elastic restoration of the suspension wires 240. The driving plate 210 may be operated by a voice coil motor (VCM) actuator that is not shown. A VCM coil (not shown) and a VCM magnet (not shown) may be disposed on one side where the driving plate 210 and the base plate 250 face each other. The driving plate 210 may be translated on the x-y surface perpendicular to the optical axis C by electromagnetic force between the VCM coil and the VCM magnet.

The suspension wires 240, having one end fixed to the driving plate 210, extend to the tilt correction plate 280 through the base plate 250 and are fixed to the tilt correction plate 280. For example, one end of the suspension wires 240 may be bound to a proper coupler (not shown) and be fixed to the driving plate 210, along with fastening protrusions 240a for preventing detachment of the driving plate 210. Similarly, another end of the suspension wires 240 may be bound to a proper coupler (not shown) and be fixed to the tilt correction plate 280, along with the fastening protrusions 240a for preventing detachment of the tilt correction plate 280. The suspension wires 240 may be symmetrically aligned with respect to the optical axis C and, as shown in FIG. 2, may be inserted into 4 corners of each of the driving plate 210, the base plate 250, and the tilt correction plate 280.

The tilt correction plate 280 may be disposed at the rear of the base plate 250 and thus the base plate 250 and the tilt correction plate 280 may be fastened by using correction screw members 271 and reference secure screw member 275 that are screwed in the base plate 250 through the tilt correction plate 280. In this regard, a first length L1 between surfaces of the base plate 250 and the tilt correction plate 280 that face each other may be varied according to tightening of the screw members 271 and 275 between the base plate 250 and the tilt correction plate 280, which increases or decreases a suspension wire portion (L2, a second length portion) by which the base plate 250 and the driving plate 210 are spaced from each other, so that tilting of the driving plate 210 may be corrected and the surface of the driving plate 210 may be maintained on the x-y surface perpendicular to the optical axis C.

Figure 3:
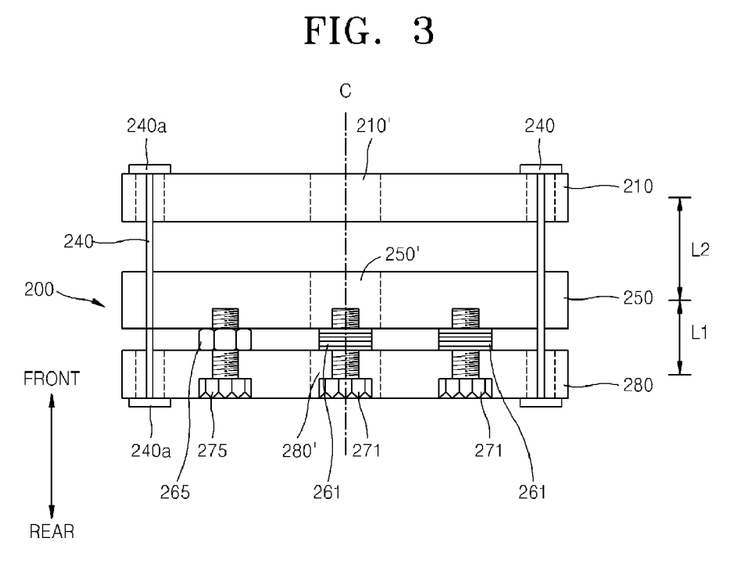
FIG. 3 is a cross-sectional view of the image stabilization driving assembly of FIG. 1, assembled according to an embodiment of the invention.
Figure 4A:
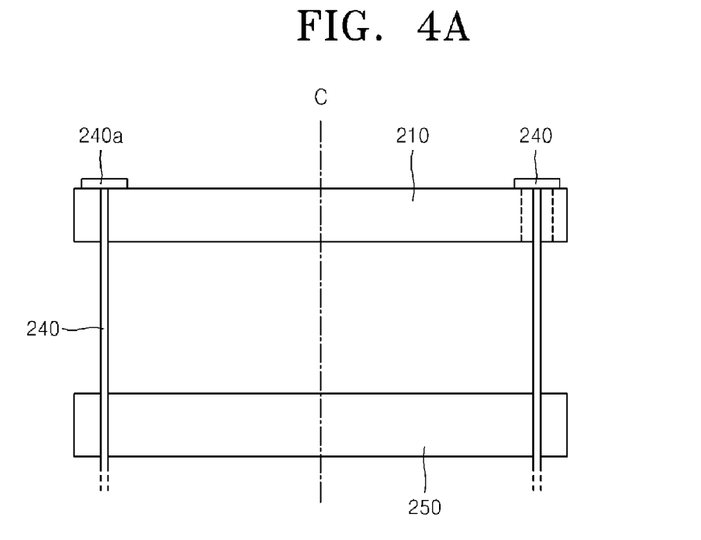
FIGS. 4A and 4B are cross-sectional views of transformation statuses of suspension wires according to a correction operation, according to an embodiment of the invention.
Figure 4B:
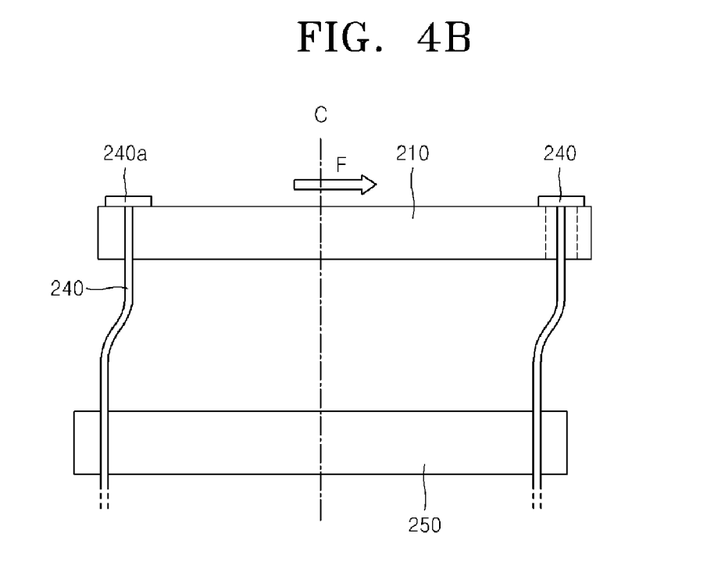

FIG. 3 is a cross-sectional view of the image stabilization driving assembly 200 of FIG. 1, assembled according to an embodiment of the invention. FIGS. 4A and 4B are cross-sectional views of transformation statuses of suspension wires 240 according to a correction operation, according to an embodiment of the invention. Referring to FIG. 3, the driving plate 210 is disposed at the front of the base plate 250 and the tilt correction plate 280 is disposed at the rear of the base plate 250. The driving plate 210, the base plate 250, and the tilt correction plate 280 constitute an assembly by the suspension wires 240 passing through edge portions of the assembly. The suspension wires 240 have one end fixed to the tilt correction plate 280 and another end fixed to the driving plate 210. The fastening protrusions 240a may be provided to both ends of the suspension wires 240.

A VCM actuator that is not shown may be mounted on a surface between the driving plate 210 and the base plate 250. The driving plate 210 may perform a translation motion on a surface perpendicular to the optical axis C by using the VCM actuator as a power source. Referring to FIGS. 4A and 4B, the suspension wires 240 track repulsive driving of the driving plate 210 and elastically bend, and at the time when a driving force F is removed, move the driving plate 210 to its original location by using elastic restoration so that a center of the correction lens 110 may be arranged on the optical axis C. The suspension wires 240 may be metal fine lines having a diameter of 100~200 μm.

The base plate 250 and the tilt correction plate 280 are screwed into each other in three different positions: the correction screw members 271 are fastened into two of the three positions, and the reference secure screw member 275 is fastened into the remaining position. The correction screw members 271 are screwed into the base plate 250 through the tilt correction plate 280. Screw fastening between the correction screw member 271 and the base plate 250 is adjusted to vary the first length L1 between the base plate 250 and the tilt correction plate 280. For example, the first length L1 is reduced and the second length L2 between the base plate 250 and the driving plate 210 increases by intensifying the screw fastening. Consequently, the first length L1 increases and the second length L2 between the base plate 250 and the driving plate 210 is reduced by attenuating the screw fastening. In more detail, tilting of the driving plate 210 may be corrected by varying the length (corresponding to the second length L2)

of the suspension wires 240 extending between the base plate 250 and the driving plate 210. If the driving plate 210 is not disposed on an x-y surface perpendicular to the optical axis C and is inclined at a predetermined angle with the x-y surface, the correction lens 110, which integrally operates with the driving plate 210, moves along the inclined surface, and thus fails to precisely correct shake and causes distortion in an image.

The correction screw members 271 may be fastened in at least two positions in order to correct the tilting of the driving plate 210. The correction screw members 271 are screwed in two positions in order to adjust a tilted surface of the driving plate 210 in 2 independent directions. Elastic members 261 are disposed in positions where the correction screw members 271 are fastened. The elastic members 261 are disposed between the base plate 250 and the tilt correction plate 280, and are compressed according to the fastening of the correction screw members 271, and elastically transform so that the base plate 250 and the tilt correction plate 280 are elastically biased in opposite directions to each other.

The reference secure screw member 275 may be prepared to secure a reference position of a correction surface, wherein the correction surface is perpendicular to the optical axis C, along with the correction screw members 271. The reference secure screw member 275 establishes a position of the correction surface when correcting for inclined tilting surface of the driving plate 210 to the correction surface, which is perpendicular to the optical axis C. As shown in FIG. 3, the position of the correction surface is determined by a boss member 265 that is disposed between the base plate 250 and the tilt correction plate 280 and secures a predetermined space between the base plate 250 and the tilt correction plate 280. The reference secure screw member 275 is fastened through the boss member 265. The boss member 265 may be formed of a rigid metal material capable of minimizing transformation against the screw fastening between the base plate 250 and the tilt correction plate 280.

Figure 5:
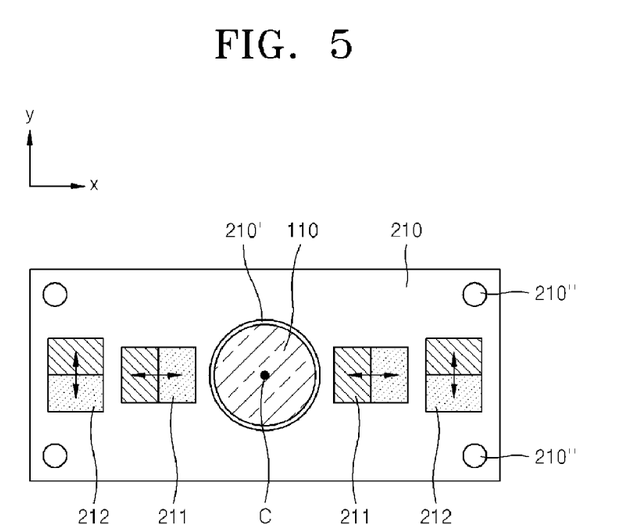
FIG. 5 is a plan view of a driving plate, according to an embodiment of the invention.

FIG. 5 is a plan view of the driving plate 210, according to an embodiment of the invention. Referring to FIG. 5, the correction lens 110 is inserted into the center of the driving plate 210. Two pairs of first and second magnets 211 and 212 that constitute a part of a VCM actuator are symmetrically disposed with respect to the center of the driving plate 210, i.e., the optical axis C. The pairs of first and second magnets 211 and 212 provide a driving force along x-axis or y-axis directions, respectively, through an electromagnetic correlation between the pairs of first and second magnets 211 and 212 and a VCM coil (not shown). An N-S polarity of the first magnet 211 is inverted in the x-axis direction and provides a driving force in the x-axis direction, and an N-S polarity of the second magnet 212 is inverted in the y-axis direction and provides the driving force in the y-axis direction. The first and second magnets 211 and 212 may be in the form of a permanent magnet. The first and second magnets 211 and 212, requiring no additional signal wiring, are disposed on the driving plate 210 for which a correction operation is required, thereby basically resolving a power supply or a signal transfer to a dynamic element. Meanwhile, the suspension wires 240 are inserted into four assembly holes 210"

Figure 6:
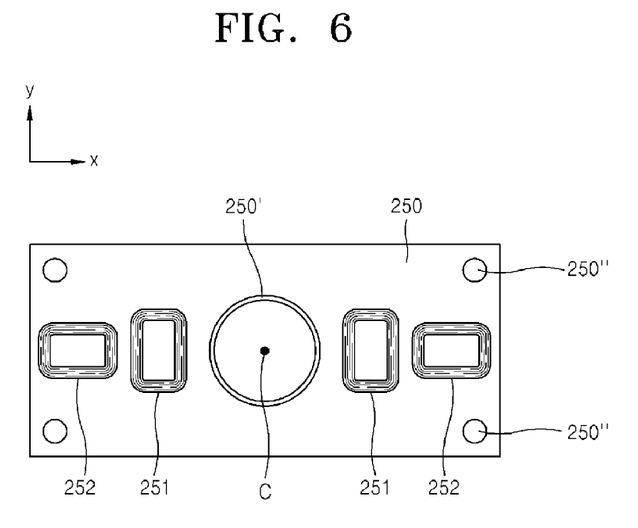
FIG. 6 is a plan view of a base plate disposed to face the driving plate shown in FIG. 5, according to an embodiment of the invention.

FIG. 6 is a plan view of a base plate 250 disposed to face the driving plate 210 shown in FIG. 5, according to an embodiment of the invention. Referring to FIG. 6, an optical transmission hole 250' through which an image of an object is transmitted provides an optical path disposed in the center of the base plate 250. The pairs of the first and second magnets 211 and 212 facing pairs of first and second coils 251 and 252 provide a driving force along x-axis and y-axis directions, respectively, through electromagnetic correlation therebetween. For example, the pairs of first and second coils 251 and 252 may include conductive wires that are coiled in roughly the form of a rectangle, may have induced N-S or S-N polarity at the front and rear by inverting a direction of current applied to the conductive wires in a forward direction or in a reverse direction, provide an electromagnetic repulsive force with regard to the same polarities through the electromagnetic correlation between the pairs of the first and second coils 251 and 252 and the pairs of the first and second magnets 211 and 212, and provide an electromagnetic attractive force with regard to opposite polarities, thereby driving the driving plate 210.

The pair of first coils 251 extends in a y direction to increase the selective characteristics of the polarity of the pair of first magnets 211 having the polarity inverted in an x direction. The pair of second coils 252 extends in the x direction to increase the selective characteristics of the polarity of the pair of second magnets 212 having the polarity inverted in the y direction. Both ends of the first and second coils 251 and 252 may be connected to a circuit substrate (not shown) that converts a control signal of the camera DSP 150 shown in FIG. 1 disposed in the camera into a proper driving signal. The circuit substrate may include the base plate 250 and may be disposed in a position inside the camera. The first and second coils 251 and 252, requiring wiring of the driving signal, are disposed on the base plate 250, and the first and second magnets 211 and 212, requiring no wiring of the driving signal, are disposed on the driving plate 210 for which a correction operation is required, thereby basically excluding interference of wiring according to dynamic movement and promoting safe transfer of a signal. Meanwhile, the suspension wires 240 are inserted into four assembly holes 250".

As described above, the pair of first magnets 211 and the pair of first coils 251, which face each other, constitute an x-direction driving unit of the VCM actuator. The pair of first magnets 211 and the pair of first coils 251 are disposed with regard to the optical axis C, thereby stabilizing an x-direction motion of the correction lens 110. The correction operation of offsetting an image shake may be limited to a minimum range of image stabilization since excessive correction operations may cause distortion in an image. In this regard, the x-direction driving unit of the VCM actuator is not designed in one position and is symmetrically designed in two positions with regard to the optical axis C, thereby limiting motion trajectory of the correction lens 110 while achieving stable driving. Similarly, the pair of second magnets 212 and the pair of second coils 252, which face each other, constitute a y-direction driving unit of the VCM actuator. The y-direction driving unit of the VCM actuator is not designed in one position and is symmetrically designed in two positions with regard to the optical axis C, thereby limiting motion trajectory of the correction lens 110 and achieving stable driving.

Figure 7:
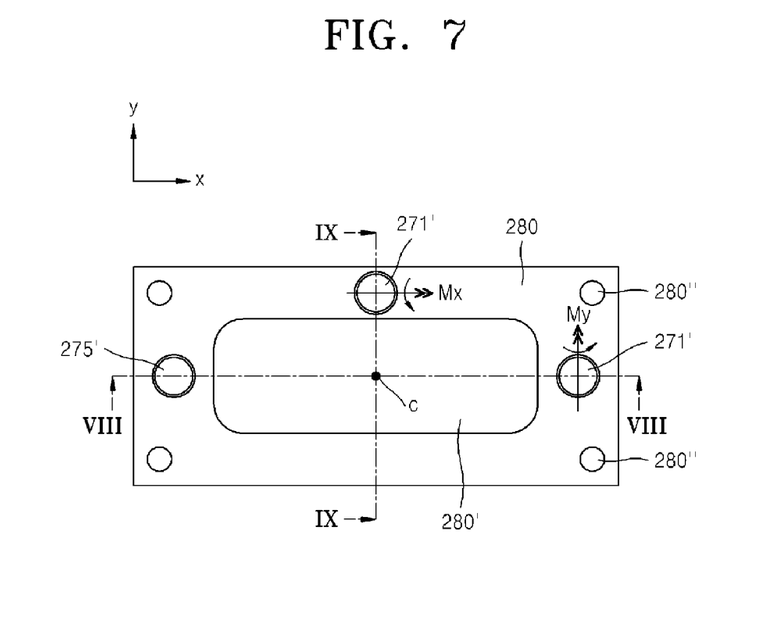
FIG. 7 is a plan view of a tilt correction plate, according to an embodiment of the invention.

FIG. 7 is a plan view of the tilt correction plate 280, according to an embodiment of the invention. Referring to FIG. 7, a roughly rectangular optical transmission hole 280' through which an image of an object is transmitted provides an optical path disposed in the center of the tilt correction plate 280. First and second fastening holes 275' and 271' through which the reference secure screw member 275 and the correction screw members 271 enter are disposed around the optical transmission hole 280'. For example, the reference secure screw member 275 may be assembled on a left side of the tilt correction plate 280 through the first fastening hole 275', and the correction screw members 271 may be assembled on the upper and right sides of the tilt correction plate 280 through the second fastening holes 271'. Meanwhile, the suspension wires 240 are inserted into four assembly holes 280"

Figure 8:
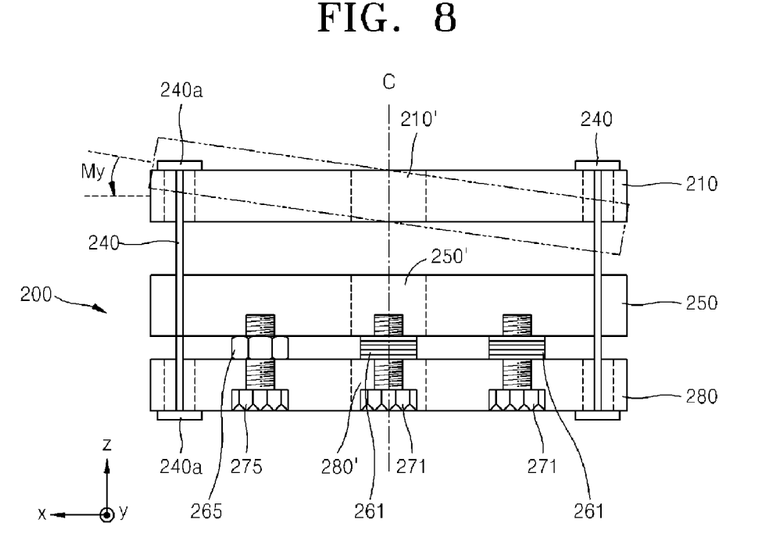
FIG. 8 is a cross-sectional view of the tilt correction plate taken from along a line VIII-VIII shown in FIG. 7.
Figure 9:
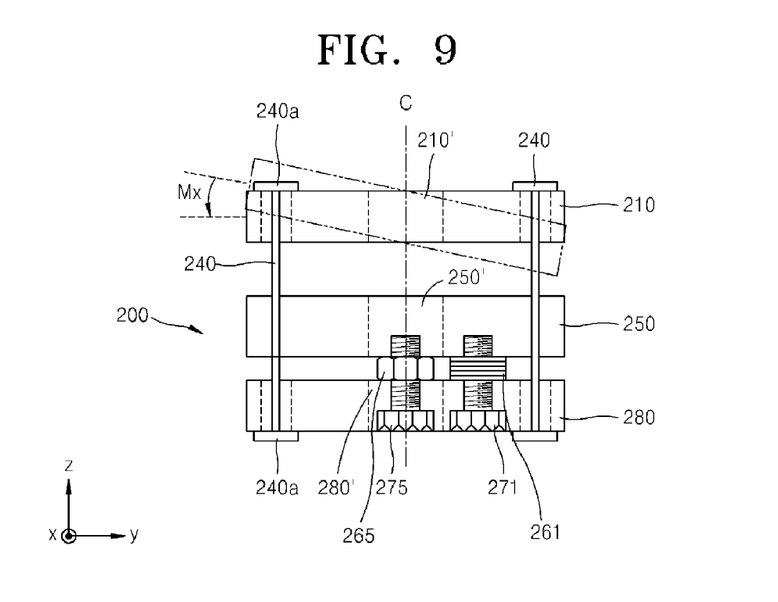
FIG. 9 is a cross-sectional view of the tilt correction plate taken from along a line IX-IX shown in FIG. 7.

FIG. 8 is a cross-sectional view of the tilt correction plate 280 taken along a line VIII-VIII shown in FIG. 7. Referring to FIG. 8, tilting can be corrected in a first rotation direction My by adjusting the fastening of the correction screw member 271 assembled on the right side of the tilt correction plate 280. FIG. 9 is a cross-sectional view of the tilt correction plate 280 taken from along a line IX-IX shown in FIG. 7. Referring to FIGS. 7 and 9, tilting can be corrected in a second rotation direction Mx by adjusting the fastening of the correction screw member 271 assembled on the upper side of the tilt correction plate 280.

Figure 10A:
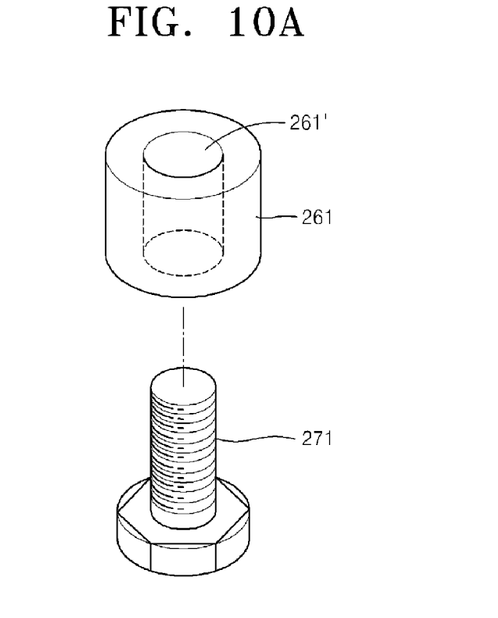
FIGS. 10A and 10B illustrate one of elastic members disposed between a base plate and a tilt correction plate, according to an embodiment of the invention.
Figure 10B:
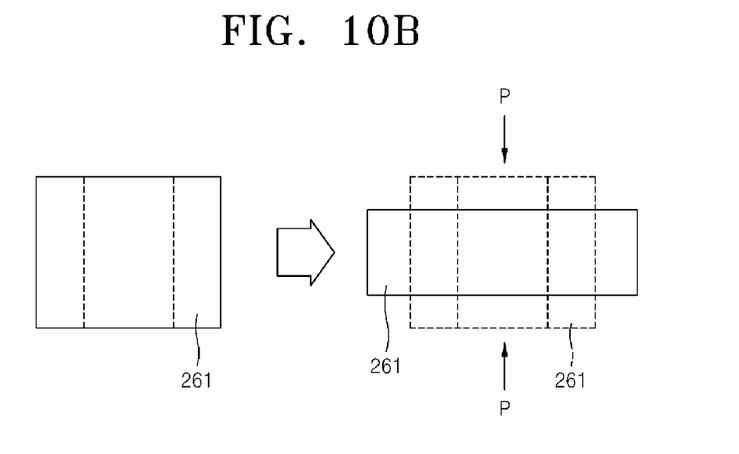

FIGS. 10A and 10B illustrate one of the elastic members 261 disposed between the base plate 250 and the tilt correction plate 280, according to an embodiment of the invention. Referring to FIG. 10A, the elastic members 261 may include a cylindrical hollow member and may be formed of a rubber material or a flexible plastic member. The correction screw members 271 may be inserted into a hollow portion 261' of the elastic members 261. The base plate 250 and the tilt correction plate 280 are fixed onto each other by the correction screw members 271 through the elastic members 261. The elastic members 261 are elastically compressed by a screw fastening force P. Since the elastic members 261 provide a continuous elastic force in a direction such that the base plate 250 and the tilt correction plate 280 are forced away from each other, hard elastic materials having a high limit of elastic transform may be preferred as the elastic members 261. If one of the elastic members 261 lost its elastic force exceeding the limit of the elastic transform, the base plate 250 may be inclined.

Figure 11A:
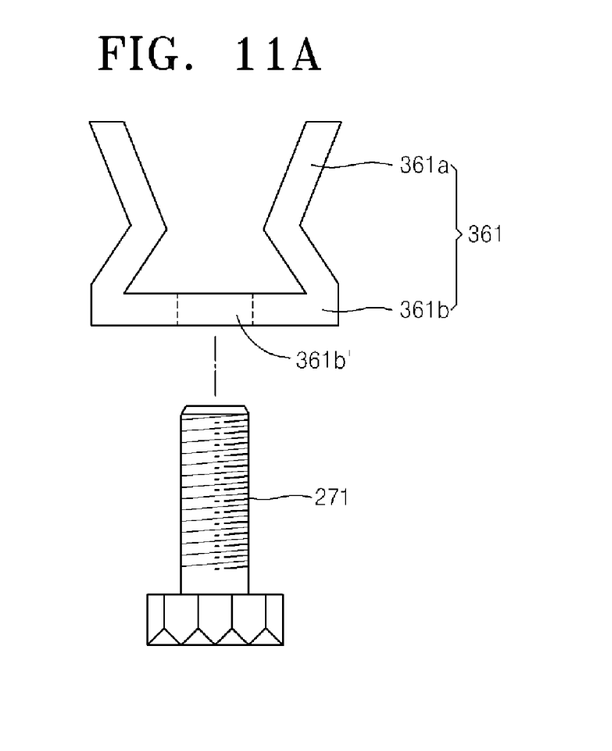
FIGS. 11A and 11B illustrate an elastic member, according to another embodiment of the invention.
Figure 11B:
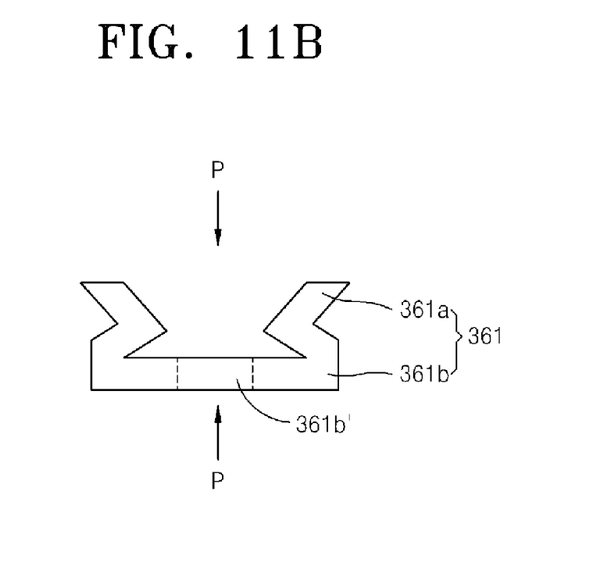

FIGS. 11A and 11B illustrate an elastic member 361, according to another embodiment of the invention. Referring to FIGS. 11A and 11B, the elastic member 361 includes a leg portion 361$a$ that is elastically bent and a plate member 361$b$ including an assembly hole 361$b$' into which one of the correction screw member 271 is inserted. The elastic member 361 is compressed by the screw fastening force P between the base plate 250 and the tilt correction plate 280 facing the base plate 250 according to the fastening of the correction screw members 271 so that the leg portion 361$a$ provides an elastically bent bias.

Figure 12:
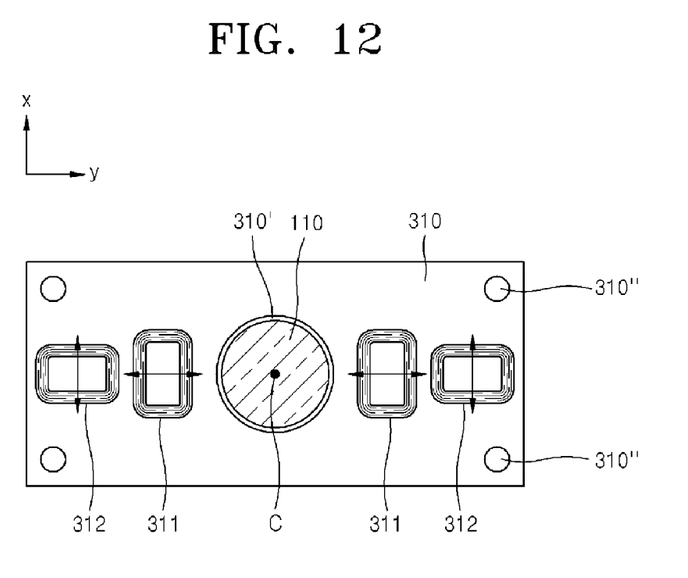
FIGS. 12 and 13 are plan views of a driving plate and a base plate, respectively, according to another embodiment of the invention.
Figure 13:
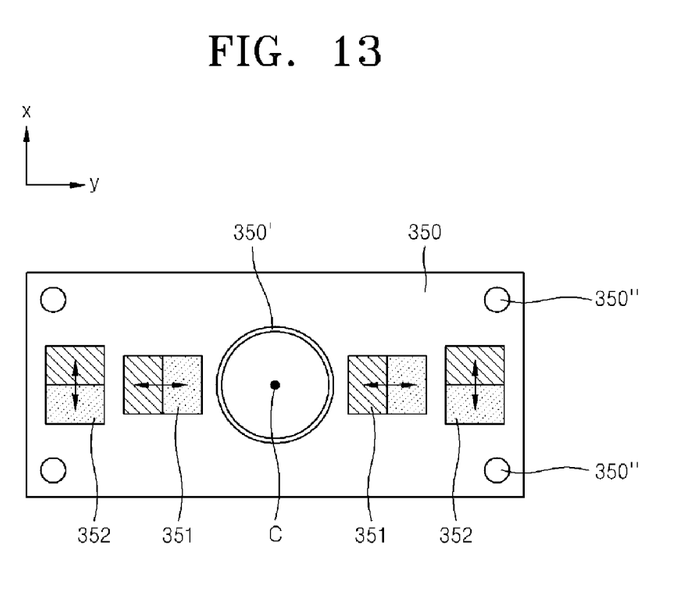

FIGS. 12 and 13 are plan views of a driving plate 310 and a base plate 350, respectively, according to another embodiment of the invention. Referring to FIGS. 12 and 13, two pairs of first and second coils 311 and 312 that constitute a part of a VCM actuator are disposed in the driving plate 310. Two pairs of first and second magnets 351 and 352 that produce a driving force through electromagnetic correlation between the pairs of first and second magnets 351 and 352 and the pairs of first and second coils 311 and 312 are disposed on the base plate 350. The pairs of first and second coils 311 and 312 have relatively less weight than the pairs of first and second magnets 351 and 352 and are disposed on the driving plate 310, thereby increasing acceleration performance and driving efficiency of a correction operation, and achieving prompt response characteristics simultaneously with the application of a signal. For example, both ends of the pairs of the first and second coils 311 and 312 may be electrically connected to a circuit substrate (not shown) disposed on the base plate 350 and may use signal wiring or use conductivity of suspension wires (not shown) connecting the driving plate 310 and the base plate 350 as signal wiring. Alternatively, both ends of the pairs of the first and second coils 311 and 312 may be connected to a soft circuit substrate (not shown) directly connected to the camera DSP 150 shown in FIG. 1 of a camera and may receive a driving signal. Meanwhile, optical transmission holes 310' and 350' provide an optical path of an object image. Suspension wires are inserted into assembly holes 310" and 350".

Figure 14:
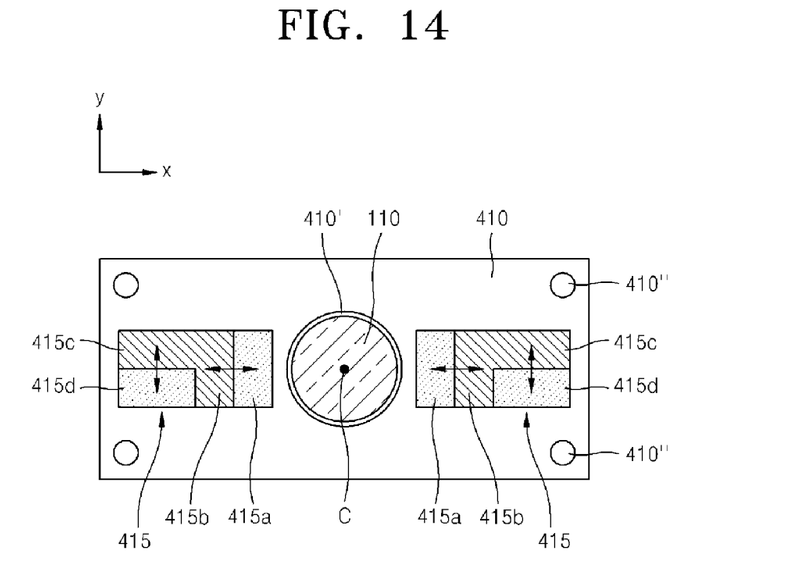
FIGS. 14 and 15 are plan views of a driving plate and a base plate, respectively, according to another embodiment of the invention.
Figure 15:
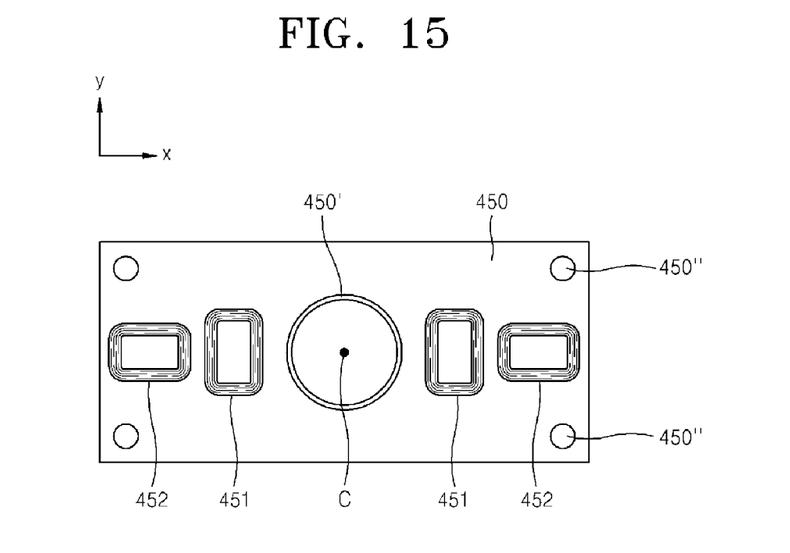

FIGS. 14 and 15 are plan views of a driving plate 410 and a base plate 450, respectively, according to another embodiment of the invention. Referring to FIGS. 14 and 15, the correction lens 110 is inserted into the center of the driving plate 410. A pair of unified 2-axially driving magnets 415 that constitutes a part of a VCM actuator is symmetrically disposed with respect to the optical axis C. In the embodiment, magnetization of the magnets 415 is changed so that both polarities following an x-direction and a y-direction can be realized by using the unified 2-axially driving magnets 415. That is, a first magnetism element 415$a$ and a second magnetism element 415$b$ having polarities inverted in the x-direction are used to achieve x-direction driving, and a third magnetism element 415$c$ and a fourth magnetism element 415$d$ having polarities inverted in the y-direction are used to achieve y-direction driving.

Two pairs of first and second coils 451 and 452 that constitute the VCM actuator, along with the 2-axially driving magnets 415, may be the same as first and second coils 311 and 312 shown in FIG. 13. The structure of the base plate 450 including the two pairs of the first and second coils 451 and 452 is the same as the base plate 350 shown in the embodiment described with reference to FIGS. 12 and 13 and thus the detailed description thereof will not be repeated here. Meanwhile, the two pairs of first and second coils 451 and 452 and the 2-axially driving magnets 415 may not be disposed on the base plate 450 and the driving plate 410, respectively, but the two pairs of the first and second coils 451 and 452 may be disposed on the driving plate 410 and the 2-axially driving magnets 415 may be disposed on the base plate 450.

A combination of portions 415$a$ and 415$b$ of the 2-axially driving magnet 415 and the pair of first coils 451 constitutes an x-direction driving unit of the VCM actuator. A combination of other portions 415$c$ and 415$d$ of the 2-axially driving magnet 415 and the pair of second coils 452 constitutes a y-direction driving unit of the VCM actuator. The x-direction driving unit and the y-direction driving unit are not designed in one position but are paired with respect to the optical axis C, thereby stabilizing a motion trajectory of the correction lens 110. Meanwhile, optical transmission holes 410' and 450' provide an optical path of an object image. Suspension wires are inserted into assembly holes 410" and 450".

Although the first and second magnets 211, 212, 351, and 352 and the first and second coils 251, 252, 311, 312, 451, and 452 that constitute embodiments of the VCM actuator are symmetrically disposed with respect to the optical axis C, the symmetrical positions thereof with respect to the optical axis C is not limited thereto. For example, the first and second magnets 211, 212, 351, and 352 and the first and second coils 251, 252, 311, 312, 451, and 452 may be disposed on both sides of the optical axis C and provide a uniform driving force.

The image stabilization driving assembly according to an embodiment of the invention includes an additional correction tool that can easily correct tilting of a driving plate operating along with a correction lens that limits a shake correction operation to a surface perpendicular to an optical axis. Thus, erroneous tilting that occurs during an assembling process can be immediately corrected, distortion of the image undesired by the shake correction operation can be removed, and the shake correction operation can be precisely controlled.

Also, in the image stabilization driving assembly in an embodiment of the invention, an x-direction driving unit and a y-direction driving unit that drive a driving plate in x-y directions perpendicular to the optical axis are disposed on both sides of the optical axis, thereby preventing an excessive correction operation and increasing stability of the correction operation by limiting a motion of the driving plate.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the invention are described with reference to illustrations, various modifications or adaptations of the methods and or specific structures described may become apparent to those skilled in the art. All such modifications, adaptations, or variations that rely upon the teachings of the invention, and through which these teachings have advanced the art, are considered to be within the spirit and scope of the invention. Hence, these descriptions and drawings should not be considered in a limiting sense, as it is understood that the invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. An image stabilization driving assembly for correcting a camera shake comprising:
   a driving plate in which a correction lens is mounted and that operates in a direction perpendicular to an optical axis;
   a base plate that supports the driving plate at a rear of the driving plate;
   a tilt correction plate fastened at a rear of the base plate and that adjusts the fastening degree and corrects tilting of the driving plate; and
   a plurality of suspension wires having one end fixed to the driving plate, another end fixed to the tilt correction plate, and extending through the base plate, the plurality of suspension wires formed of an elastic material.

2. The image stabilization driving assembly of claim 1, wherein the base plate and the tilt correction plate are screwed into each other.

3. The image stabilization driving assembly of claim 2, wherein the base plate and the tilt correction plate are screwed into each other in different first, second, and third positions.

4. The image stabilization driving assembly of claim 3, wherein two elastic members that apply an elastic bias in directions against the base plate and the tilt correction plate are disposed in the first and second positions.

5. The image stabilization driving assembly of claim 4, wherein at least one of the respective elastic members is a cylindrical hollow member that includes an assembly hole into which a screw member is inserted.

6. The image stabilization driving assembly of claim 4, wherein at least one of the elastic members comprises a plate member including the assembly hole into which the screw member is inserted and an elastically bent leg portion extending from the plate member.

7. The image stabilization driving assembly of claim 3, wherein a rigid boss member that secures a predetermined space between the base plate and the tilt correction plate is disposed in the third position.

8. The image stabilization driving assembly of claim 1, further comprising: a voice coil motor (VCM) magnet and a VCM coil disposed on two surfaces where the driving plate and the tilt correction plate face each other and that perform an electromagnetic correlation.

9. The image stabilization driving assembly of claim 8, wherein the VCM magnet is disposed in the driving plate and the VCM coil is disposed in the base plate.

10. The image stabilization driving assembly of claim 8, wherein the VCM magnet is disposed in the base plate and the VCM coil is disposed in the driving plate.

11. The image stabilization driving assembly of claim 8, wherein the VCM magnet comprises a pair of first magnets and a pair of second magnets disposed on both sides of the optical axis, respectively,
   wherein the first magnets are disposed to invert N-S polarity in a first direction, and the second magnets are disposed to invert the N-S polarity in a second direction.

12. The image stabilization driving assembly of claim 8, wherein the VCM magnet comprises a pair of unified magnets disposed on both sides of the optical axis,
   wherein the unified magnets are magnetized to have a portion where the N-S polarity is inverted in a first direction and have another portion where the N-S polarity is inverted in a second direction.

13. The image stabilization driving assembly of claim 8, wherein the VCM coil comprises a pair of first coils and a pair of second coils disposed on both sides of the optical axis, respectively.

14. An image stabilization driving assembly for correcting a camera shake comprising:
   a driving plate in which a correction lens is mounted and that operates in a direction perpendicular to an optical axis;
   a base plate that supports the driving plate at a rear of the driving plate;
   a plurality of suspension wires that elastically connect the driving plate and the base plate; and
   a pair of driving units that provide a driving force to the driving plate and that are disposed on both sides of the optical axis.

15. The image stabilization driving assembly of claim 14, wherein the pair of driving units comprises a pair of first direction driving units and a pair of second direction driving units that produce a driving force in first and second directions, respectively, perpendicular to the optical axis, wherein the pair of first direction driving units and the pair of second direction driving units are disposed on both sides of the optical axis, respectively.

16. The image stabilization driving assembly of claim 14, wherein the pair of driving units comprises a VCM magnet and a VCM coil disposed on two surfaces where the driving plate and the tilt correction plate face each other and that perform an electromagnetic correlation.

17. The image stabilization driving assembly of claim 16, wherein the VCM magnet is disposed in the driving plate and the VCM coil is disposed in the base plate.

18. The image stabilization driving assembly of claim 16, wherein the VCM magnet is disposed in the base plate and the VCM coil is disposed in the driving plate.

19. The image stabilization driving assembly of claim 16, wherein the VCM magnet comprises a pair of first magnets and a pair of second magnets disposed on both sides of the optical axis, respectively, wherein the first magnets are disposed to invert N-S polarity in a first direction, and the second magnets are disposed to invert the N-S polarity in a second direction.

20. The image stabilization driving assembly of claim 16, wherein the VCM magnet comprises a pair of unified magnets disposed on both sides of the optical axis, wherein the unified magnets are magnetized to have a portion where the N-S polarity is inverted in a first direction and have another portion where the N-S polarity is inverted in a second direction.

21. The image stabilization driving assembly of claim 16, wherein the VCM coil comprises a pair of first coils and a pair of second coils disposed on both sides of the optical axis, respectively.

* * * * *